United States Patent [19]

Masaki et al.

[11] Patent Number: 5,471,451
[45] Date of Patent: Nov. 28, 1995

[54] DISK APPARATUS INCLUDING NOTIFYING OF CLEANING TIMING AND CONTROL METHOD THEREOF

[75] Inventors: Takashi Masaki; Shigenori Yanagi, both of Kawasaki; Manabu Yamamoto, Sayama, all of Japan

[73] Assignees: Fujitsu Limited, Kawasaki; Nippon Telegraph and Telephone Corporation, Tokyo, both of Japan

[21] Appl. No.: 111,084

[22] Filed: Aug. 24, 1993

[30] Foreign Application Priority Data

Aug. 27, 1992 [JP] Japan ................... 4-228506

[51] Int. Cl.⁶ .................................................. G11B 3/58
[52] U.S. Cl. ................................................ 369/71
[58] Field of Search ....................... 369/71, 72, 73, 369/74; 360/128, 97.02; 15/DIG. 12, DIG. 13, DIG. 14

[56] References Cited

U.S. PATENT DOCUMENTS 5,088,082  2/1992  Yamada et al. ...................... 369/71

FOREIGN PATENT DOCUMENTS

| | | |
|---|---|---|
| 61-170958 | 8/1986 | Japan . |
| 2-168481 | 6/1990 | Japan . |
| 3-78123 | 4/1991 | Japan . |
| 3-78179 | 4/1991 | Japan ............................... 369/72 |
| 3147583 | 6/1991 | Japan ............................... 369/72 |
| 4-167229 | 6/1992 | Japan . |
| 4243012 | 8/1992 | Japan ............................... 360/128 |
| 4360012 | 12/1992 | Japan ............................... 360/128 |
| 2250627 | 6/1992 | United Kingdom ............... 360/128 |

*Primary Examiner*—John H. Wolff
*Assistant Examiner*—William R. Korzuch
*Attorney, Agent, or Firm*—Greer, Burns & Crain, Ltd.

[57] ABSTRACT

An apparatus for reading at least information by projecting a light beam from an optical head onto an optical disk rotated by a spindle motor. The rotation time of the spindle motor is measured, and upon reaching of a predetermined time, a cleaning request signal is sent to an upper order system. The rotation time of the spindle motor is counted by counting pulses generated with the rotation with a first counter stored in the RAM. Upon reaching of a predetermined value by the count of the first counter, a second counter stored in a non-volatile memory is updated. Upon reaching of a predetermined value by the second counter, a cleaning request is sent to the upper order system for display on a CRT, and a cleaning request flag in a non-volatile memory is set. When the end of cleaning of the apparatus is recognized, the cleaning request flag in the non-volatile memory is cleared.

4 Claims, 8 Drawing Sheets

5,471,451

DISK APPARATUS INCLUDING NOTIFYING OF CLEANING TIMING AND CONTROL METHOD THEREOF

BACKGROUND OF THE INVENTION

This invention relates to optical disk apparatus used with replaceable optical disks each accommodated in a cartridge and, more particularly, to a method of controlling the cleaning of the optical head or the like of such optical disk apparatus, in which a cleaning request is made to an upper order apparatus under control of cleaning time.

In a prior art optical disk apparatus used with read-only optical disks or rewritable optical magnetic disks, a laser is used for reading and writing information. In such optical disk apparatuses, an object lens converses a laser beam to be projected and focused on a recording film of a rotating optical disk. However, if the apparatus is used for reading or writing without cleaning for long time, a window, through which the objective lens is exposed to the outside, is contaminated by dust to result in read or write errors. More specifically, in the write operation dust reduces the light intensity of the emitted beam to result in insufficient writing of information on the optical disk, thus generating verify errors. In the read operation, dust reduces the light intensity of both emitted and returned beams to result in insufficient reproduced signal amplitude, thus generating read errors. Accordingly, it is required to control the cleaning of the optical head of the optical disk apparatus.

Heretofore, it has been prescribed to carry out the cleaning of the optical head and other optical components of the optical disk apparatus periodically, and it is done by the user or maintenance personnel. Where the cleaning is made periodically, however, the extent of contamination of the optical part of the apparatus varies with the circumstances of use of the apparatus. Therefore, if the apparatus is used highly frequently, read or write errors may be generated by dust before the periodic cleaning. Further, in the vent of negligence of the periodic cleaning, read and write errors are generated without any known cause, making it necessary to call maintenance personnel for inspection.

SUMMARY OF THE INVENTION

According to the invention, an optical disk apparatus and a cleaning control method therefor are provided, which can properly notify when cleaning is needed. The optical disk apparatus according to the invention has a function of reading at least information with a light beam projected form an optical head onto an optical disk rotated by a spindle motor. According to the invention, the rotation time of the spindle motor in such optical disk apparatus is measured, and upon reaching of a predetermined time by the rotation time a request signal for the cleaning of the optical disk apparatus is provided to the upper order system.

Specifically, rotation pulses provided with the rotation of the spindle motor are counted by a first counter provided on a RAM (a volatile memory). Every time the count of the first counter reaches a predetermined value, the count of a second counter provided in the non-volatile memory is updated by adding the count of the first counter. At this time, the first counter is cleared, and the next time counting is started. The count of the second counter in the non-volatile memory is compared with a predetermined value corresponding to a predetermined time necessary for the cleaning. When this predetermined value is reached, an optical disk apparatus cleaning request signal is sent to the upper order system for display. At the same time, a cleaning request flag is set in the non-volatile memory. Further, for the next counting the second counter is cleared. When it is recognized that cleaning is carried out after the cleaning request, the cleaning request flag information in the non-volatile memory is cleared.

The optical disk apparatus according to the invention has a loading/unloading function of loading the optical disk accommodated in a cartridge on the spindle motor shaft when the cartridge is externally inserted and unloading the optical disk from the spindle motor shaft and ejecting the same to the outside in response to an optical disk unload instruction. In this function, the number of times of optical disk ejection is counted by a third counter provided in the RAM, a volatile memory. Whenever the number of ejection times counted by the third counter reaches a predetermined value, the count of the second counter is updated by adding the count of the first counter. At this time, the third counter is cleared. The count of the second counter is compared with a predetermined value corresponding to a predetermined time necessary for the cleaning. When this predetermined time is reached, an optical disk apparatus cleaning request signal is sent to the upper order system for display. At the same time, cleaning request flag information is set.

In the optical disk apparatus, the rotation of spindle motor causes dust to be sucked in from the outside and attached to the optical head. Accordingly, it may be thought to measure the duty service time of the optical disk apparatus, i.e., the power "on" time. However, the power "on" time includes time, during which the spindle motor is not rotated. This means that time with less dust attachment possibility is also measured. Therefore, it is impossible to properly grasp the status of contamination and properly recognize the cleaning request. In contrast, according to the invention the spindle motor rotation time with possibility of dust attachment is measured, and thus it is possible to properly grasp the status of contamination and properly make the cleaning request.

Further, since the second counter for showing the measured spindle motor rotation time is stored in the non-volatile memory, when the power is made "off", the previous measured spindle motor rotation time information is not deleted, and thus it is possible to obtain continual time measurement even in the event of the power "off". Further, since the cleaning request flag is preserved irrespective of the power "off" for the cleaning, when it is subsequently recognized that the cleaning is necessary, new cleaning control can be started by clearing the cleaning request in the non-volatile memory. Further, the spindle motor rotation time is counted by the second counter in the non-volatile memory, and whenever the count of the first counter in the volatile memory reaches a predetermined value, the count of the second counter in the non-volatile memory is updated by adding the count of the first counter. It is thus possible to reduce the number of times of time-consuming accessing of the non-volatile memory, and cleaning control can be made without adversely affecting other controls. Further, it is possible to reduce the bits of the first and second counters.

Further, in the optical disk apparatus according to the invention the number times of optical disk ejection is counted by the third counter in the volatile memory, and whenever the number of ejection times reaches a predetermined number, the second counter in the non-volatile memory is updated by adding the count of the first counter in the volatile memory. Again in this case, the second counter in the non-volatile memory is updated when and only when the predetermined value is reached by the number of times of the optical disk ejection. Thus, it is possible to reduce the number of times of time-consuming accessing of the non-volatile memory, and the cleaning control has no adverse effects on other controls. Further, it is possible to reduce the bits of the first and second counter.

The above and other objects, features and advantages of the present invention will become more apparent from the following detailed description with reference to the drawings.

DETAILED DESCRIPTION OF THE PREFERRED EMBODIMENTS

Figure 1:
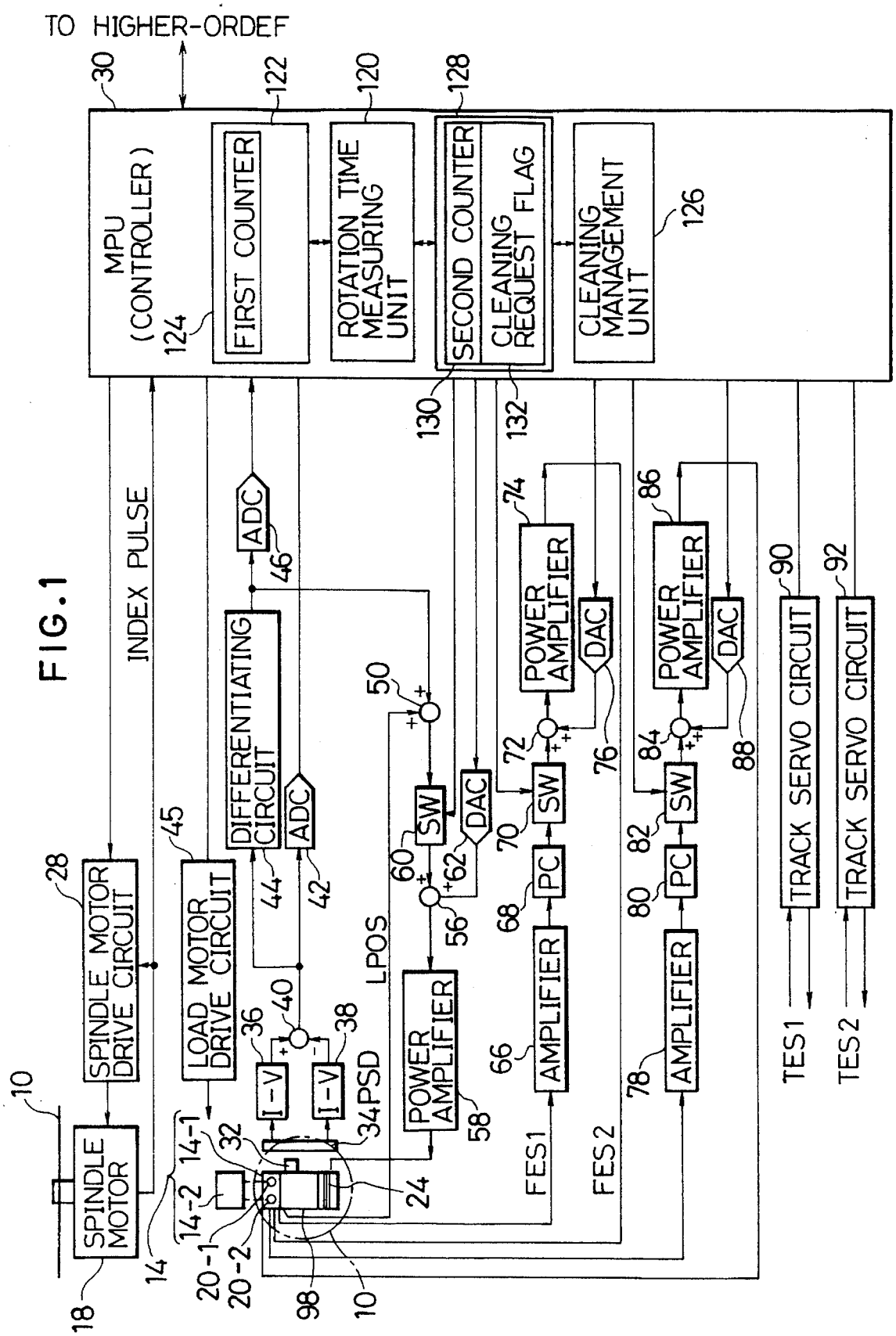
FIG. 1 is a block diagram showing a first embodiment of the invention.

FIG. 1 shows a first embodiment of the optical disk apparatus according to the invention. An optical disk 10 is checked on the shaft of a spindle motor 18. A carriage 98 carries an optical head 14 mounted on one side of it and a voice coil motor 24 head actuator mounted on the other side of it. In this embodiment, the optical head 14 has two lens actuators 20-1 and 20-2. For the sake of the description, the spindle motor 18 and carriage 98 are shown such that they are separate from each other.

Figure 2:
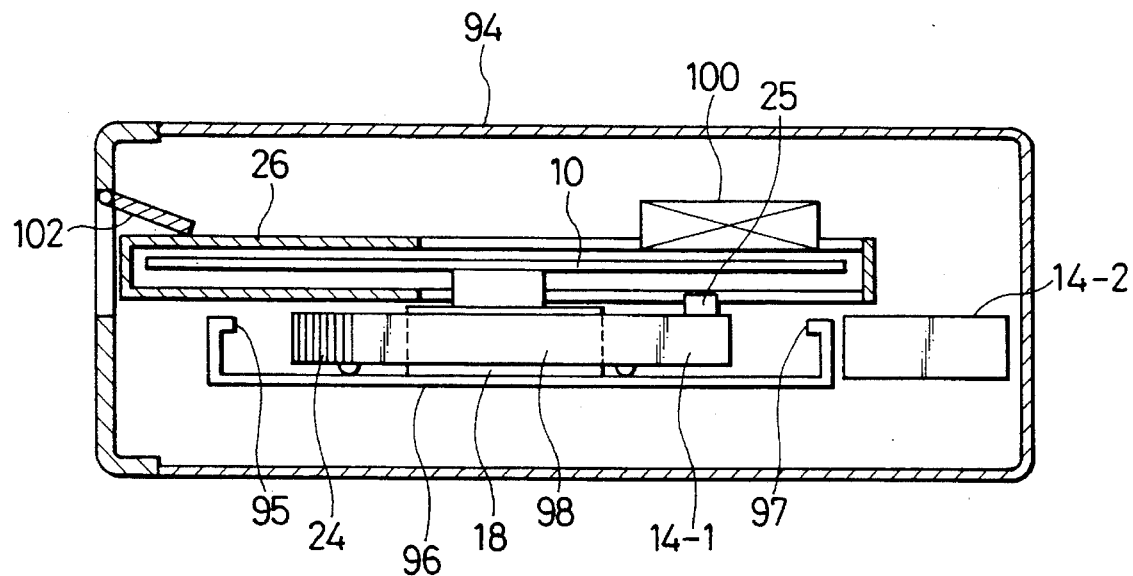
FIG. 2 is a view showing the internal structure of the optical disk apparatus according to the invention.
Figure 3:
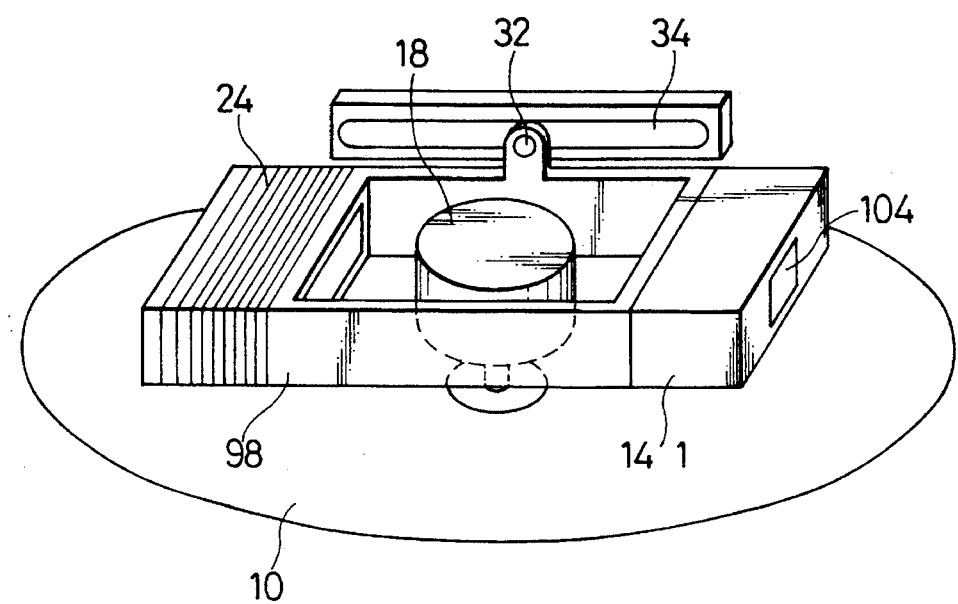
FIG. 3 is a view showing the optical disk apparatus of FIG. 2 with a cartridge taken out from the bottom.

FIG. 2 shows the internal structure of the optical disk apparatus. The apparatus has a housing 94, in which is disposed a support frame 96 supporting the carriage 98 for movement therealong. The carriage 98 carries an optical head movable part 14-1, having an objective lens 25 provided at the right end and a voice coil motor 24 at the left end. The support frame 96 has an inner periphery and an outer periphery stopper 95 and 97 provided on the left and right sides, respectively. The cartridge 98, as shown from the back side in FIG. 3, has a central rectangular cavity with a spindle motor 18 disposed therein. The optical disk 10 accommodated in the cartridge 26, is checked by loading on the shaft of the spindle motor 18. The cartridge 26 is checked on the shaft of the spindle motor 18 by a loading mechanism when it is inserted into the housing 94 by pushing and opening a door 102 thereof. An electromagnet 100 for erasing is arranged on the upper portion of the cartridge 26.

A light-emitting diode 32 is mounted on one side of the bottom of the carriage 98, and on the stationary side a position sensor 34 is disposed such as to face the position detecting diode 32. The position of the cartridge 98, i.e., the position of a beam in the optical head removal part 14-1 mounted on the carriage 98, can be detected by the light-emitting diode 32 and position sensor 34. The optical lead movable part 14-1 provided on the cartridge 98 has a light incidence window 104, and an optical head stationary part 14-2 is disposed on the stationary side as shown in FIG. 14-2 such that it faces the light incidence window 104. In the movable part 14-1 of the head a head optical system is mounted, which includes at least an objective lens and a lens actuator. The other components of the optical system, such as a laser diode, are provided on the side of the optical head stationary part 14-2 to reduce the weight of the side of the optical head movable part 14-1 and reduce the inertia of the carriage 98.

Figure 4:
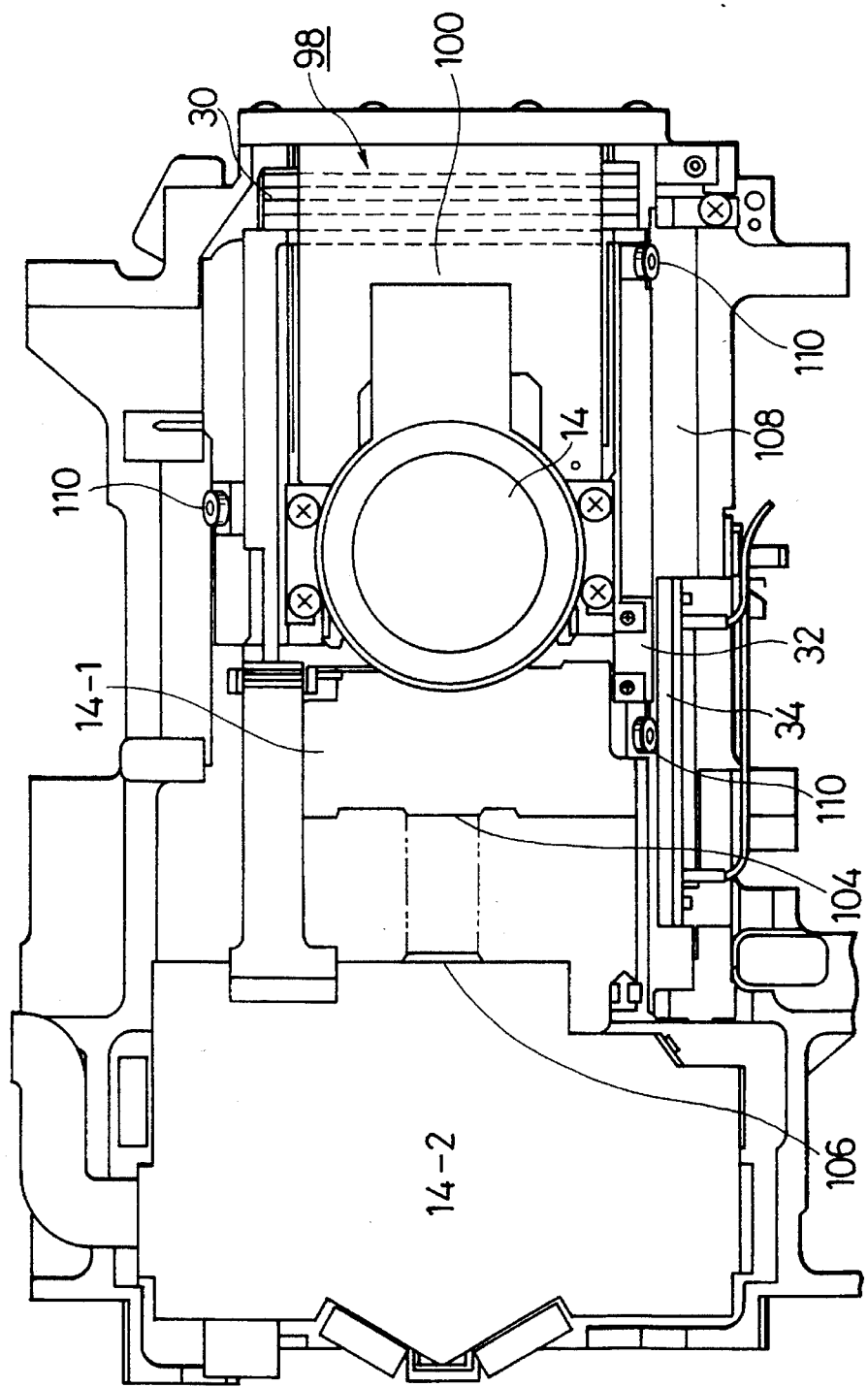
FIG. 4 is a bottom view showing the optical disk apparatus shown in FIG. 2.

FIG. 4 is a bottom view of the internal structure shown in FIG. 2. The carriage 98 has rollers 110 and is movable along a stationary frame side rail 108. On the right side of the carriage 98 the optical head movable part 14-1 is disposed such as to face the optical head stationary part 14-2. The optical head movable and stationary parts 14-1 and 14-2 have respective light incidence/emission windows 104 and 106, which face each other and are aligned irrespective of the position of the carriage 98. A coil 30 of a voice coil motor 24 is provided on the carriage (98 at the right end thereof. Further, the carriage 98 has a light-emitting diode 32, which projects a light beam onto a stationary part side position sensor 62 to detect a position signal of the carriage 98, i.e., the optical head movable part 14-1.

Figure 5:
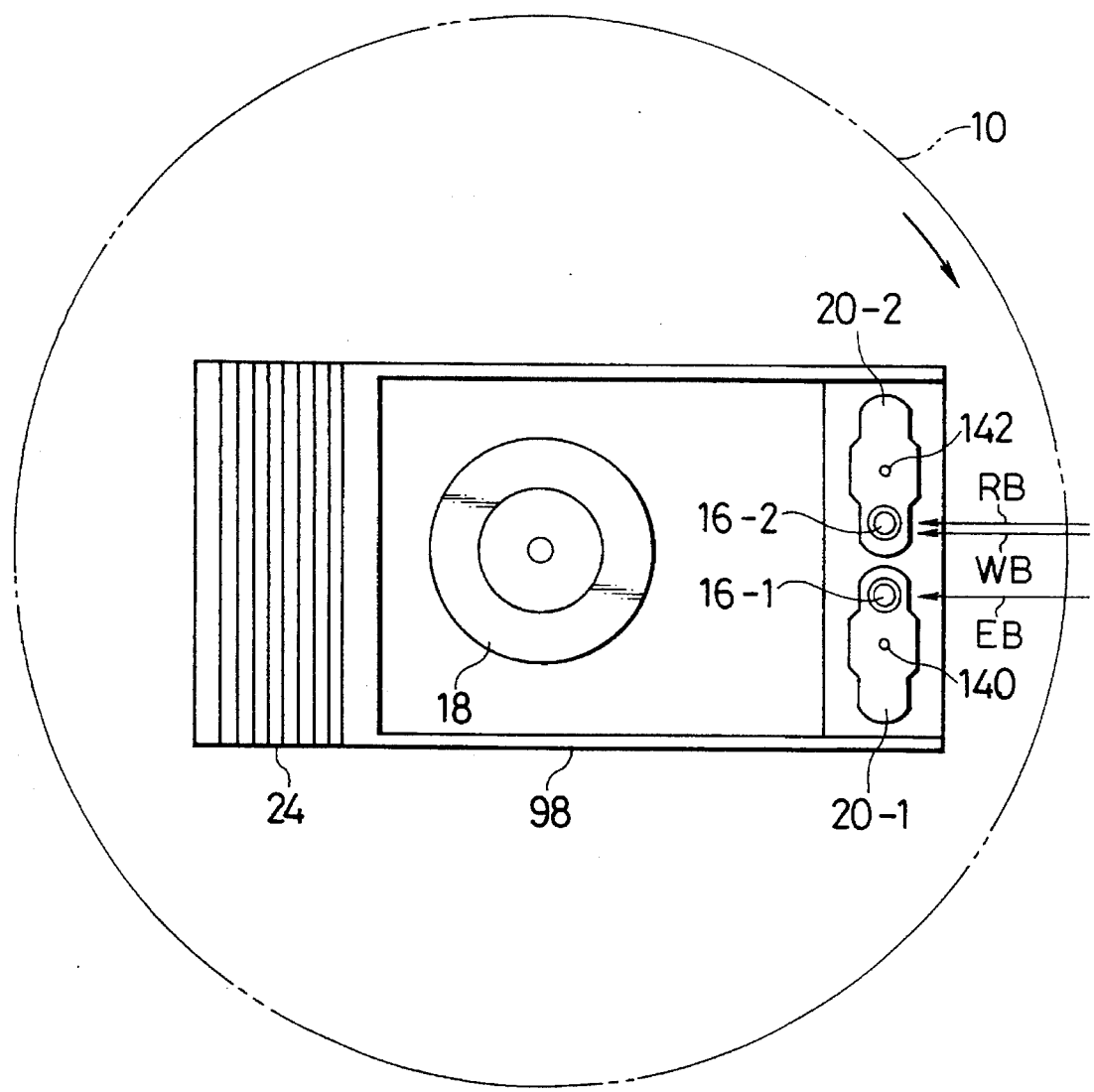
FIG. 5 is a view showing a lens actuator mounted on the carriage shown in FIG. 2.

FIG. 5 shows the optical head used according to the invention. The optical head movable part provided at one end of the carriage 98 has two lens actuators 20-1 and 20-2. The lens actuators 20-1 and 20-2 are rotatable about respective pins 140 and 141. They have objective lenses 16-1 and 16-2 provided on their facing ends. Assuming the direction of rotation of the optical disk 10 to be clockwise as shown by the arrow, an erase beam EB is projected on the preceding objective lens 14-1, while two beams, i.e., a write and a lead beam, WB and RB, are projected on the succeeding objective lens 16-2.

Figure 6:
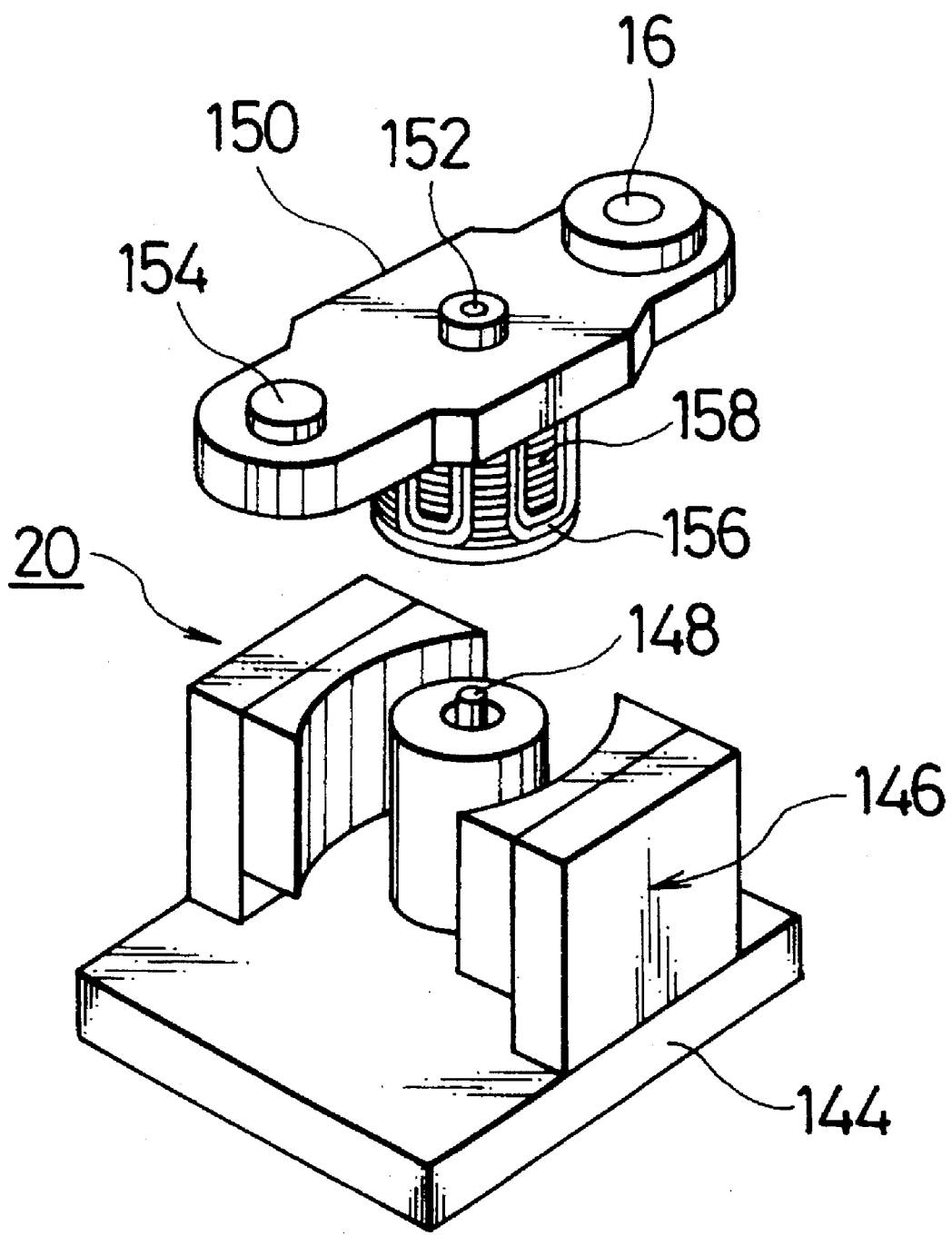
FIG. 6 is an exploded perspctive view showing the lens actuator shown in FIG. 4.

FIG. 6 shows one of the actuator lenses shown in FIG. 5. A base 144 has a magnetic circuit 146 and pin 148 disposed at the center of the magnetic circuit 146. A rotatable arm 150 is provided as a movable part with respect to the base 144 which is the stationary part. The rotatable arm 150 has a lower cylindrical projection, on which a tracking coil 156 and a focus coil 158 are wound. The rotatable arm 150 has an objective lens 16 provided adjacent one end and a balancer weight 154 provided adjacent the other end. The rotatable arm 150 has a central bore 152 which is fitted on the pin 148, and it is capable of rotation about and displacement along the pin. The subjects of cleaning are objective lenses 16-1 and 16-2 of the optical head movable part 14-1 shown in FIG. 5 and light incidence/emission window 104 of this part and light incidence/emission window 106 of the optical head stationary part 14-2 shown in FIG. 4.

Referring back to FIG. 1, a position control servo unit is provided for controlling the position of the optical head 14 mounted on the carriage 98 with the voice coil motor 24. When the position sensor 34 is illuminated by light from tile light-emitting diode 32, currents corresponding to the illuminated position are obtained from opposite terminals of the position sensor 34. These currents are converted in I-V converters 36 and 38 into voltage signals. An adder 40 takes the difference between these voltage signals to produce a carriage position signal. The carriage signal is converted in an A/D converter 42 into digital data which is input to an MPU 30 operating as a controller. The carriage position signal from the adder 40 is also differentiated in a differentiator 44 and then converted in an A/D converter 46 into digital data which is input to the MPU 30. At the start of the seek, the MPU 30 sets acceleration data in the DA converter 62 with the switch 60 held "off" and applies an acceleration signal to the voice coil motor 24 via the adder 56 and power amplifier 58, thus causing movement of the carriage 98. When the movement of the carriage 98 is started, the CPU 30 sets speed control data in the D/A converter 62 such that the speed signal from the D/A converter 46 is a desired speed signal so as to cause movement of the carriage 98 at a constant speed. During the movement of the carriage, the MPU 30 monitors the number of remaining tracks up to the desired track by detecting cleared tracks from, for instance, a tracking detection signal TES1. When a predetermined number of tracks (several tracks) is reached by the number of remaining tracks up to the desired track, an operation of pulling the beam in the desired track is started. More specifically, the MPU 30 sets a deceleration signal in the D/A converter 62 and starts deceleration control. At the same time, the track servo circuits 90 and 92 are started, thus starting tracking control of beam by the track actuator shown in FIG. 6. Further, the MPU 30 turns on the switch 60. To the switch 60 is a input lens position signal (LPOS), via an adder 50, from a position sensor (not shown) for detecting the position of the lens 16 provided in the rack actuator shown in FIG. 6. Thus, a double servo state is brought about, in which a position servo for maintaining the lens position detection signal (LPOS) at zero position is provided with the switch 60 held "on". Thus, while causing deceleration control of the carriage 98 with respect to the desired track position, the beam is projected onto the desired track through lens position control by the tracking servo circuit 90, and the carriage 98 is caused to follow the lens movement with position servo according to the lens position detection signal (LPOS) such that zero position results as the positional relation between the carriage 98 and lens actuator with respect to the movement of the lens under tracking control, thus effecting the pull-in of the beam in the desired track. A differential signal obtained about the carriage position signal, obtained from the differentiating circuit 44 to the adder 50, enhances the response at the time of the pull-in to the track by the double servo.

Further, two focusing circuits are provided for the lens actuators 20-1 and 20-2 provided in the optical head 14. The focusing circuit for the lens actuator 20-1 includes an amplifier 66, a phase compensator 68, a switch 70, an adder 72, a power amplifier 74, and a D/A converter 76. The focusing circuit corresponding to the lens actuator 20-2 includes an amplifier 78, a phase compensator 80, a switch 82, an adder 84, a power amplifier 86 and a D/A converter 88. In the focusing circuit, for instance for the lens actuator 20-1, the amplifier 66 amplifies focus error signal FES1 obtained from reflected light beam from the optical disk, and then the phase compensator 68 provides leading phase compensation. At the time of focus servo, the switch 70 is held "on" by the MPU 30, and the output of the phase compensator 68 is coupled through the switch 82 and adder 72 to the power amplifier 74 to drive the lens actuator 20-9 such as to minimize the focus error signal FES1 in the power amplifier 74. To the adder 72 an offset may be provided from the MPU 30 through the D/A converter 76. The focusing circuit for the lens actuator 20-2 is likewise in operation.

The spindle motor 18 is driven by a spindle motor drive circuit 28 according to a start or stop instruction from the MPU 30. As the spindle motor 18 is used, for instance, a brushless DC motor, it outputs an index pulse once for every rotation. Further, a load motor drive circuit 45 is provided, which drives a load motor in a load mechanism according to a load or unload instruction from the MPU 30. The load motor drive circuit 45, upon reception of a load instruction from the MPU 30, drives the load motor to chuck the optical disk 10 in the cartridge 26 on the shaft of the spindle motor 18 by loading, as shown in FIG. 2. Upon reception of an unload instruction from the MPU 30, it drives the load motor reversely to unload the optical disk 10 in the cartridge 26 from the shaft of the spindle motor 18 and eject the same to the outside.

For realizing the cleaning control according to the invention, as its functions the MPU 30 includes a rotation time measuring unit 120, a first counter 124 accommodated in a RAM 122 as non-volatile memory, a cleaning control unit 126 and a second counter 130 and a cleaning request flag 13 provided in an EEPROM (electric erasable programmable read-only memory) 128.

Whenever an index pulse is provided, the rotation time measuring unit 120 causes one up-counting of the first counter 124 in the RAM 122, the progressive count being stored in the RAM 122. Since the rotational speed of the spindle motor 18 is fixed, for instance at 2,400 rpm, the index pulse generation period is also fixed. Thus, the count of the first counter 124 represents the rotation time of the spindle motor 18. Further, whenever the first counter 126 counts an index pulse, the rotation time measuring unit 120 checks whether a predetermined value is reached by the count of the first counter 124 in the RAM 122. When a predetermined time, for instance indicative of one hour, is reached by the count of the first counter 124, the second counter 130 accommodated in the EEPROM 130 is updated by adding the count of the first counter 124 indicative of one hour, for instance. At this time, the first counter 122 is cleared. In practice, the maximum count of the first counter 124 is set to, for instance, a binary number representing one hour, and upon occurrence of a count-over the first counter 124 is cleared, and the second counter 130 is updated by adding one. Thus, the second counter 130 accumulates the operation time of the spindle motor 18.

Whenever the second counter 130 is updated, the cleaning control unit 130 compares the updated operation time to a predetermined rotation time, for instance 500 hours, which requires prescribed cleaning of the optical disk apparatus. When the count of the second counter 130 surpasses the predetermined value corresponding to 500 hours, a cleaning request signal is sent out to an upper order system, for instance a personal computer. At the same time, the cleaning request flag 128 in the EEPROM 130 is turned on to indicate that the cleaning request is made. Further, the second counter 130 is cleared for the measurement of new rotation time.

Figure 7:
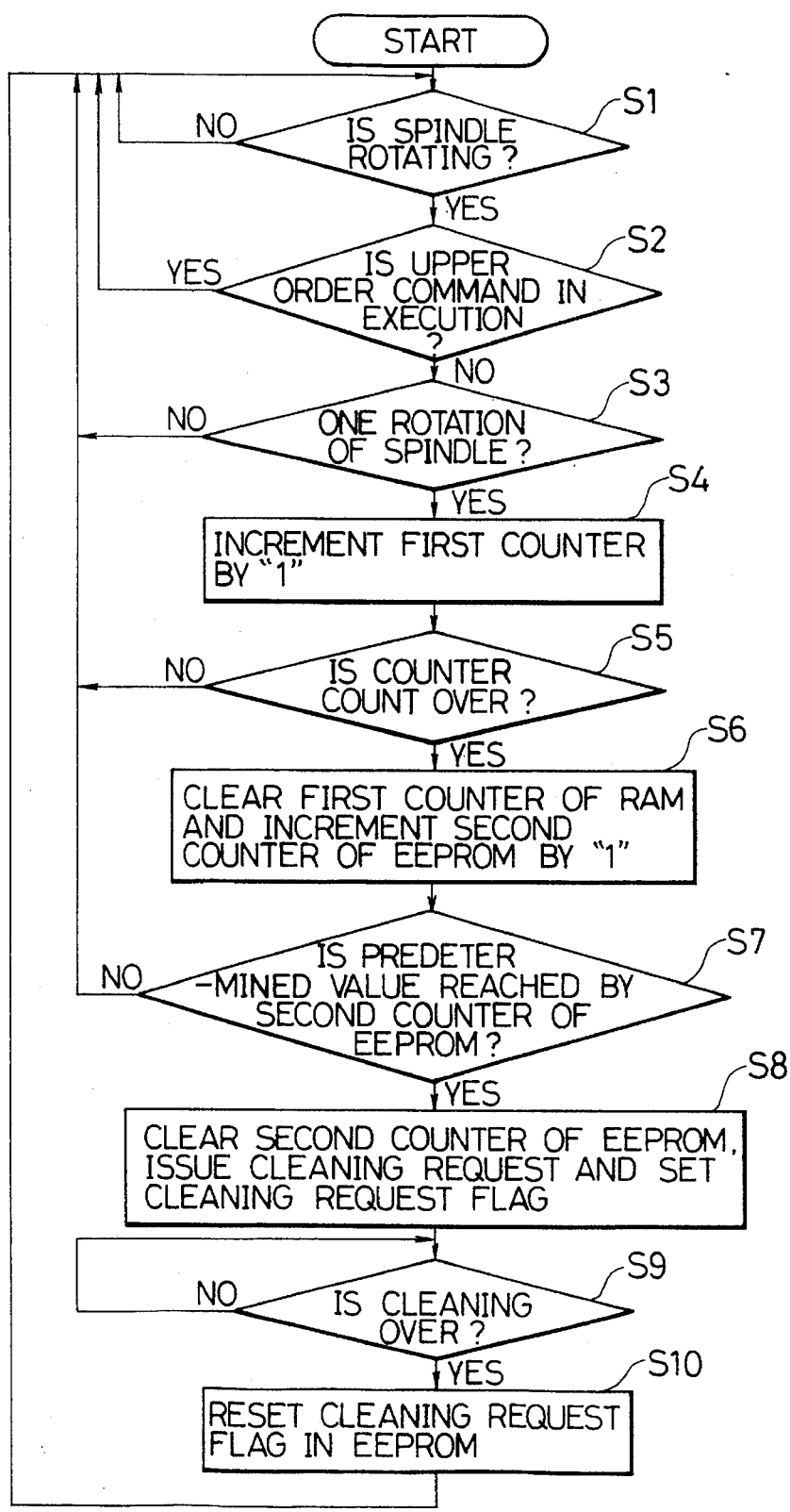
FIG. 7 is a flow chart illustrating the routine operation of the first embodiment.

The flow chart of FIG. 7 shows the cleaning control routine operation of the first embodiment of the invention. In a step S1, the MUP 30 checks whether the spindle motor 18 is rotating. If it is decided in the step S1 that the spindle motor 18 is rotating, the MPU 30 checks in a step S2 whether an operation corresponding to an upper order system command, such as a seek operation, a read operation or a write operation, is in execution. If such an operation is in execution, the routine goes back to the step S1. As shown, the rotation time of the spindle motor 18 is not measured even while the motor 18 is rotated during the command execution in order to prevent delay of the seek, lead or write operation that might otherwise be caused by the measurement.

If it is found in the step S2 that no command is in execution, a step S3 is executed, in which a check is done as to whether an index pulse is input, i.e., whether one rotation of the spindle motor 18 is completed. When one rotation of the spindle motor 18 is decided according to an index pulse, a step S4 is executed, in which the count of the first counter 124 in the RAM 122 is incremented by "1". In a subsequent step S5, a check is done as to whether the count of the first counter 124 is count-over (i.e., above a predetermined value). If the count is not count-over, the routine returns to the the step S1. If it is found in the step S5 that the count of the first counter 124 is count-over, a step S6 is executed, in which the first counter 122 in the RAM 122 is cleared, while at the same time the count of the second counter 130 in the EEPROM 128 is incremented by "1". Then, in a step 57 a check is done as to whether a predetermined value is reached by the count of the second counter 130. If the predetermined value is not reached, the routine returns to the step S1.

If it is found in the step S7 that the predetermined value is reached by the count of the second counter 130, a step S8 is executed, in which the second counter 130 in the EEPROM 128 is cleared, a cleaning request signal is issued to an upper order system such as a personal computer, and the cleaning request flag 132 in the EEPROM 128 is set. When the upper order system receives the cleaning request signal from the optical disk apparatus, the routine is interrupted, and a cleaning request message is displayed on a display such as a CRT.

When the cleaning request is made in the step S8, a check is done in a step S9 as to whether the cleaning is made. The check of the completion of the cleaning in the step S9 may be done in various ways. In one such method, the depression of a clear switch provided in the optical disk apparatus after completion of the cleaning by the operator is detected. In another method, a clear flag command from the upper order system is received. In a further method, the flag is cleared by the maintenance personnel from a terminal connected to the optical disk apparatus. In a further method, the loading of a cleaning cartridge with a brush is recognized for ending the cleaning with the cleaning cartridge. If the end of the cleaning is recognized in the step S9, the cleaning request flag 132 in the EEPROM 128 is cleared in a step S10, and the routine then returns to the step S1.

In the above way, with the measurement of the rotation time of the spindle motor 18 the extent of dust attachment to the optical head 10 caused by the rotation of the spindle motor 18 is measured for judging the necessity of cleaning. It is thus possible to output a cleaning request in an adequate timing. In addition, since the count is stored in a non-volatile memory using the EEPROM 128, it is not lost in the event of the power "off". Further, since the cleaning request flag is preserved in the non-volatile memory, the cleaning request is not lost. Further, since the second counter 130 in the non-volatile memory is updated after the reaching of a predetermined value by the count of the first counter 124 in the RAM 122, it is possible to reduce the number of times of accessing the non-volatile memory and also reduce the bits of the first and second counters 122 and 130.

Figure 8:
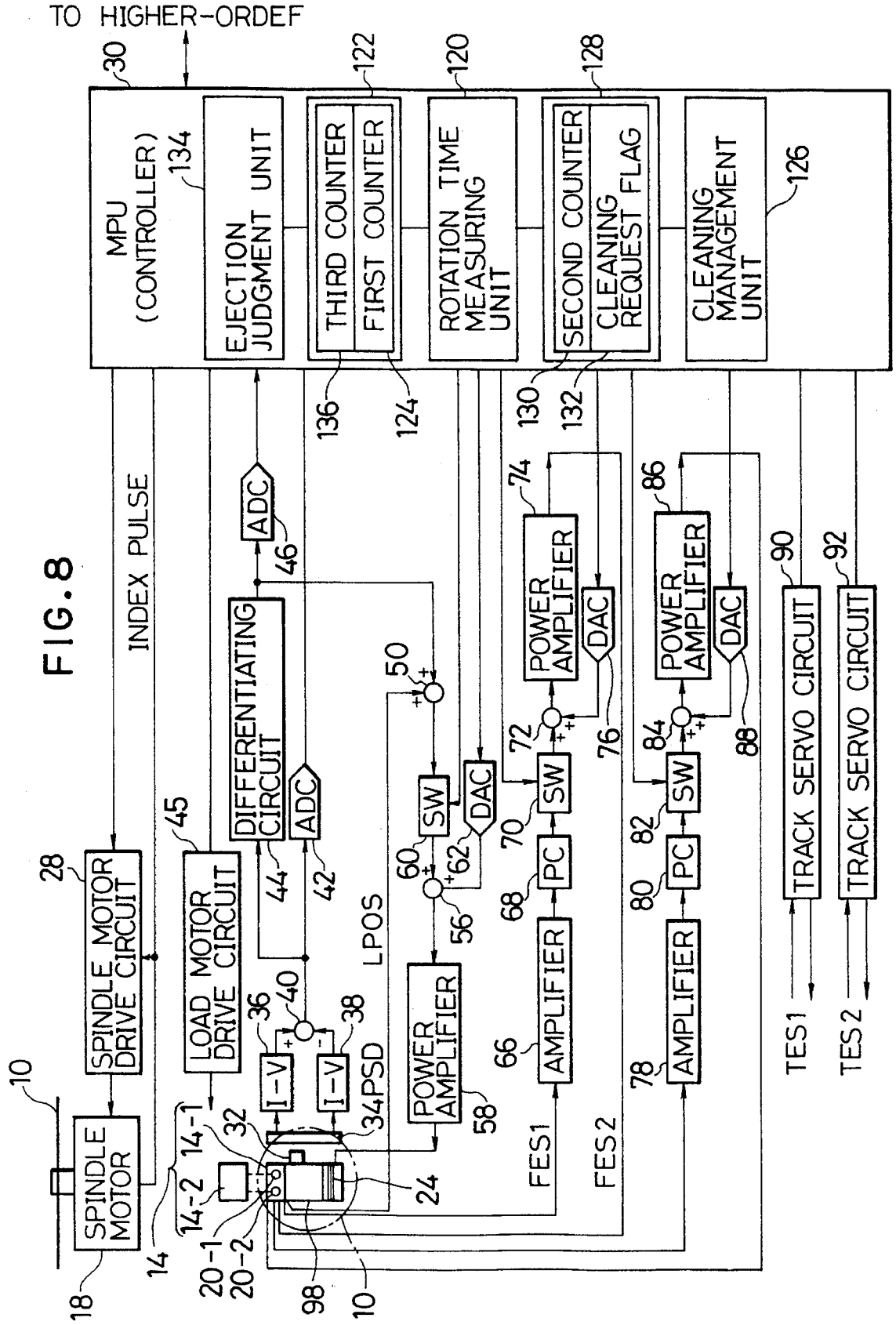
FIG. 8 is a block diagram showing a second embodiment of the invention.

FIG. 8 is a block diagram showing a second embodiment of the invention. This embodiment features the provision of additional functions of MPU 30, i.e., an ejection judgment unit 134 and a third counter 136 serving as an ejection time number counter, the remainder of the construction being the same as in the preceding embodiment shown in FIG. 1. The ejection judgment unit 134 detects ejection of the optical disk accommodated in the cartridge by an unloading operation in response to an unload instruction issued from the MPU 30 to load motor drive circuit 45, whereupon the third counter 136 in the RAM 122 is incremented by "1" by one up-counting. Whenever the third counter 136 makes one up-counting, the ejection judgment unit 134 compares the count to a predetermined ejection time number. If the predetermined ejection time number is surpassed, the rotation time measurement unit 120 updates the count of the second counter 130 in the EEPROM 128 by adding the count of the first counter 124. Since in this second embodiment the time counting for the cleaning control is done on the basis of the number of times of the optical disk ejection, an application is intended to an optical disk apparatus, which is used in the power "on" state.

Figure 9:
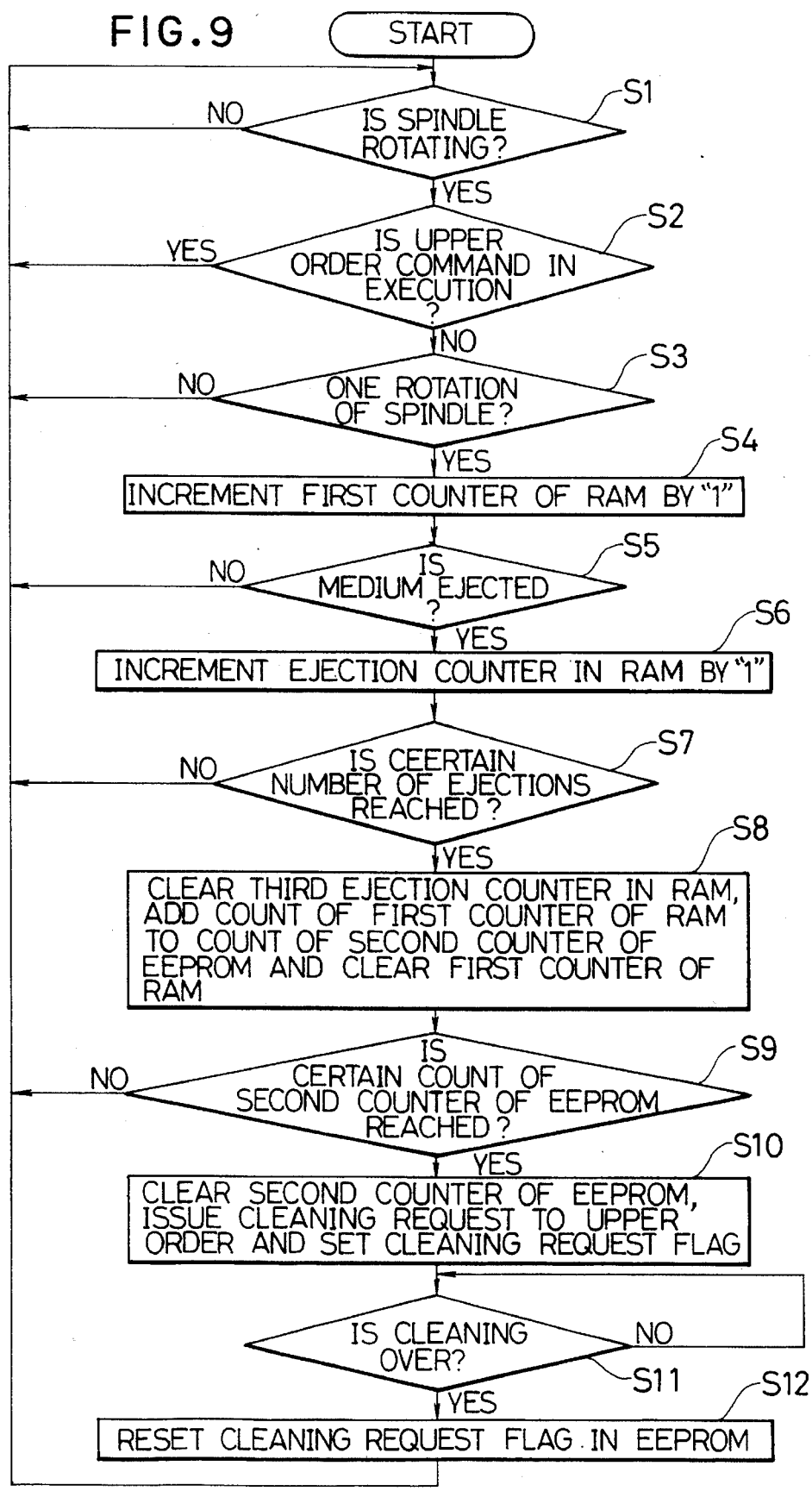
FIG. 9 is a flow chart illustrating the routine operation of the second embodiment.

The flow chart of FIG. 9 illustrates the routine operation of the second embodiment of FIG. 8 for cleaning control. In a step S1 the MPU 30 checks whether the spindle motor 18 is rotating. If the motor is rotating, a check is done in a step S2 as to whether a command is in execution. If no command is in execution, a check is done in a step S3 as to whether one rotation of the spindle motor 18 is completed. If one rotation is detected, a step S4 is executed, in which the count of the first counter 124 in the RAM 122 is incremented by "1". Then, in a step S4 a check is done as to whether the cartridge accommodating the optical disk 10 is ejected. If the cartridge is not ejected, the routine returns to the step S1. If the cartridge is ejected, a step S6 is executed, in which the third counter 136 provided in the RAM 122 is incremented by "1". Then in a step S7, a check is done as to whether the number of times of ejections as counted by the third counter 136 is a predetermined number. If the predetermined number is not reached, the routine returns to the step S1. If it is found in the step S7 that the count of the third counter 136 is exceeding the predetermined number, a step S8 is executed, in which the third counter 136 is cleared, the count of the first counter 124 in the RAM 124 is added to the count of the second counter 130 in the EEPROM 128, and the count of the first counter 124 in the RAM 124 is cleared. In a subsequent step S9 a check is done as to whether a predetermined value is reached by the count of the second counter 130 in the EEPROM 128. If the predetermined value is not reached, the routine returns to the step S1. If it is found in the step S9 that the predetermined value is reached by the count of the second counter 130, a step S10 is executed, in which the second counter 130 in the EEPROM 128 is cleared, a cleaning request is issued to the upper order system such as a personal computer, and the cleaning request flag 132 in the EEPROM 128 is set. When the upper order system receives the cleaning request from the optical disk apparatus, the routine is interrupted, and a cleaning request message is displayed on a display such as a CRT. In a subsequent step S11, a check is done as to whether cleaning is ended. When the end of the cleaning is recognized, the cleaning request flag 132 in the EEPROM 128 is cleared, and the routine returns to the step S1.

In the above way, with the measurement of the rotation time of the spindle motor 18 the extent of dust attachment to the optical head 14 caused by the rotation of the spindle motor 18 is measured to permit output of a cleaning request in a proper timing. In addition, since the count is stored in the EEPROM 128 as the non-volatile memory, the count is not lost even in the event of the power "off". Further, since the cleaning request flag is preserved, the cleaning request is not lost. Further, while the first counter 124 in the RAM 122 counts time, upon reaching of a predetermined number by the ejection time number, the count of the second counter 130 in the non-volatile memory is updated. It is thus possible to greatly reduce the number of times of time-consuming accessing to the non-volatile memory.

In this embodiment the rotation time of the spindle motor 18 is not measured during the execution of an upper order system command. However, it is possible to measure the rotation time of the spindle motor 18 during upper order system command execution as well as if the MPU 30 has redundancy. Further, while the EEPROM was used as the non-volatile memory, it is possible to use a non-volatile memory using a battery as a power supply as well. Further, the numerical values shown in the above embodiments are by no means limitative and may be varied without departing from the scope of the invention.

What is claimed is:

1. An optical disk apparatus, comprising:

disk rotating means for rotating an optical disk medium;

optical head means for reading at least information from the optical disk medium rotated by said disk rotating means by projecting light thereon;

disk mounting/dismounting means for mounting said optical disk medium accommodated in a cartridge on a disk rotating shaft when said optical disk medium is inserted, and removing said optical disk medium from said rotating shaft and ejecting said removed optical disk medium according to a medium ejection instruction;

first counter means;

second counter means;

third counter means;

rotation time measuring means for counting rotating pulses which are generated from said disk rotating means by said first counter means, disk mounting/dismounting measuring means for counting the number of ejection times of the optical disk medium due to said cartridge mounting/dismounting means by said third counter means, and each time a count value of said third counter means reaches a predetermined number of ejection times, adding a count value of said first counter means to a count value of said second counter means and updating and clearing said first counter means; and cleaning management means for clearing said second counter means and transmitting a cleaning request signal of the optical disk apparatus to an upper apparatus when the count value of said second counter means reaches a predetermined value corresponding to a predetermined time at which a cleaning of the optical head means is necessary and displaying said cleaning request signal and for further setting cleaning request flag information.

2. An apparatus according to claim 1, wherein said cleaning management means clears said cleaning request flag information when the execution of the cleaning is recognized.

3. A cleaning management method of an optical disk apparatus, comprising:

a rotation time measuring step of counting rotation pulses which are obtained in association with a rotation of an optical disk medium by a first counter, a disk mounting/dismounting measuring step of counting the number of ejection times of said optical disk medium which are obtained by a mounting or dismounting of a cartridge by a third counter, and each time a count value of said third counter reaches a predetermined number of ejection times, adding a count value of said first counter to a count value of a second counter and updating, and also clearing said first counter; and a cleaning request step of clearing said second counter and transmitting a cleaning request signal of the optical disk apparatus to an upper apparatus and displaying when the count value of said second counter reaches a predetermined value corresponding to a predetermined time at which a cleaning of the optical head means is necessary, and further setting cleaning request flag information.

4. A method according to claim 3, wherein in said cleaning request step, said cleaning request flag information is cleared when the execution of a cleaning is recognized.

* * * * *